United States Patent [19]

Holden et al.

[11] Patent Number: 4,974,522
[45] Date of Patent: Dec. 4, 1990

[54] COLD-MOLDED CEMENTITIOUS COMPOSITES REINFORCED WITH SURFACE-MODIFIED POLYAMIDE FIBRES AND METHOD OF PREPARING SAME

[75] Inventors: David A. Holden; Said Dimitry, both of Waterloo, Canada

[73] Assignee: Relmech Manufacturing Limited, Elmira, Canada

[21] Appl. No.: 363,805

[22] Filed: Jun. 9, 1989

[51] Int. Cl.$^5$ ...................... C04B 14/38; C04B 16/06
[52] U.S. Cl. .......................................... 106/99; 106/97
[58] Field of Search ..................................... 106/99, 97

[56] References Cited

U.S. PATENT DOCUMENTS 4,306,911 12/1981 Gordon et al. ........................ 106/99
4,693,749 9/1987 Gale ....................................... 106/99

OTHER PUBLICATIONS

Taylor, *The Chemistry of Cements*, vol. 2, 1964, 24–25.

Primary Examiner—William R. Dixon, Jr.
Assistant Examiner—Melissa Bonner
Attorney, Agent, or Firm—Gowling, Strathy and Henderson

[57] ABSTRACT

A process was developed for modification of the surface of poly(p-phenylene terephthalamide) fibres so that these fibres function as a reinforcing agent in a cold-molded cementitious composite at levels below 1% by weight. The surface modification treatment involves treatment of the fibres with aqueous alkaline hydroxide between 20° C. and 95° C. for between 20 minutes and 7 hours. The modified fibre is used to replace asbestos in the cementitious composite and it has been found that this improves both the green strength and the flexural strength of the autoclaved material.

25 Claims, No Drawings

COLD-MOLDED CEMENTITIOUS COMPOSITES REINFORCED WITH SURFACE-MODIFIED POLYAMIDE FIBRES AND METHOD OF PREPARING SAME

FIELD OF THE INVENTION

This invention relates to the preparation of a moldable composition containing modified polyamide fibres and to the molded composition so formed.

PRIOR ART

Autoclave-cured cementitious composites are commercial materials used to fabricate non-conducting, heat resistant parts for high-voltage applications. These materials are usually fabricated by a two-step process, involving first green-body preparation by compression molding, followed by steam curing at temperatures between 100° and 200° C. to give the final product.

Generally, the green strength (i.e. ultimate flexural strength before steam curing) of these materials is low. Frequently small amounts of asbestos fibre are added to the raw material in an effort to improve the green strength and reduce the number of parts broken on removal from the mold or during transfer to the autoclave. Because asbestos is recognized to be a health hazard, there is a need for other fibrous materials to perform this function.

In prior art, used by the assignee company, the use of poly(p-phenylene terephthalamide) fibres (sold commercially in North America as Kevlar 29 (Trade-mark) by Dupont[E. I. du Pont de Nemours and Co.]} to replace asbestos was tested. This measure improves the green strength of the cement composite but is without beneficial effect on the ultimate tensile strength and flexural strength of the cured material. This is a consequence of poor dispersion of the fibres in the blend of dry raw materials and poor adhesion between the polyamide fibres and the cement matrix.

The surface modification of Kevlar (Trade-mark) fibre by aqueous solutions of alkali metal hydroxides is a known method for the creation of free amino groups on the fibre surface which serve as reactive groups to allow chemical bonding between these fibres and epoxy resins.

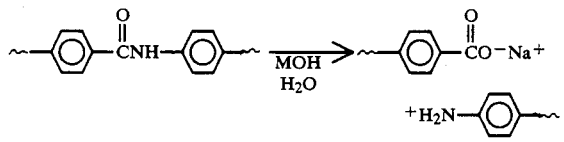

It has not been recognized that the ionic carboxylate salt groups produced in the above reaction would also promote adhesion to other kinds of matrices, such as inorganic materials. While the use of Kevlar (Trademark) fibres as a reinforcing agent for cement has been described, the deliberate use of surface modification to improve the adhesion between Kevler (Trade-mark) and cement composites has not been previously described.

SUMMARY OF THE INVENTION

The present invention relates to a method for modifying the surface of an aromatic polyamide fibre, poly(p-pheylene terephthalamide), and for preparing a cold-molded cement composite incorporating less than 0.5% by weight of these modified fibres as a reinforcing agent, and to the product so formed. The surface modification involves treatment of these fibres with a solution containing 10 to 40 weigth % of an alkali metal hydroxide, in particular sodium hydroxide. Temperatures for the reaction between the alkali solution and the fibre are such that the aqueous alkali solution is a liquid at 20° C. and above so that an atmosphere pressure cooling apparatus is not required, but below 95° C. so that pressure containment is not necessary, and particularly between 40° C. and 95° C. Reaction times between 20 minutes and 7 hours may be used, depending on temperature and concentration of the alkali solution.

A cold-molded cement composite product containing aromatic polyamide fibres modified in this way not only has enhanced green strength, but also has increased flexural strength and higher elongation at break following autoclave curing. These improvements are both with respect to the same cementitious composite prepared without aromatic polyamide fibre. The use of less than 0.5% by weight surface-modified poly(p-phenylene terephthalamide) fibre in the cement composite was dictated by the end-use of these material in high voltage applications. At higher loadings of organic compounds carbonization of the fibres can occur and hazardous arc formation can result.

DETAILED DESCRIPTION OF THE INVENTION

The present invention is based on the observation that the free ionic carboxylate salt groups generated by the surface hydrolysis reaction adhere much more tightly than the untreated polymer surface to the calcium aluminosilicate matrix of the cement composite. Essential to the success of this chemical modification procedure is the requirement that the hydrolysis reaction should be limited to a thin layer on the fibre surface so that the mechanical strength of the fibre is not impaired. If hydrolysis within the fibre itself were to take place to a significant extent, then the resulting loss of mechanical strength of the fibre would prevent its use as a reinforcing agent. The depth profile of free carboxylic acid groups within the fibre was determined by secondary ion mass spectrometry (SIMS) after labelling with $BiCl_3$. The free carboxylate salt groups produced by hydrolysis does indeed appear to be confined to a thin skin on the outer surface of the fibres. It is significant that on prolonged treatment of Kevlar (Trade-mark) fibres with hot aqueous NaOH the fibres undergo embrittlement and discoloration. The range of hydrolysis conditions claimed in this invention disclosure therefore represents the contact time necessary to achieve adequate surface modification of the fibre but without sufficient bulk degradation to adversely affect its performance as a reinforcing agent for a standard cementitious composite. Undesirable bulk degradation of the fibres can readily be identified by their appearance after surface treatment, as the fibres darken from clear yellow to dull brown in such cases.

The improvement in the adhesion between fibre and cement matrix brought about by surface hydrolysis does not appear to result from a mechanical interlocking, such as would be achieved if the action of the alkaline reagent was simply to roughen the fibre surface. Scanning electron micrographs of the untreated and surface-modified fibres shown only shallow pits less than 0.05 um deep. The extent of surface roughening produced during hydrolysis is therefore too slight to account for the observed improvement in mechanical properties of the autoclaved cement composite.

In a preferred embodiment of the invention, Kevlar 29 (Trade-mark) fibres are treated with an aqueous solution of 10 to 20% sodium hydroxide by weight, for a period of 20 minutes at a temperature of between 40° C. and 95° C. There is a relationship between the strength of the alkali solution, the duration of contact with the polyamide fibres, and the reaction temperature, as the following examples show. Thus, if 10% NaOH is used, then longer reaction times or higher reaction temperatures (90°–95° C.) are required to achieve the same results attained with 20% NaOH at 40°–45° C.

It it readily apparent that the surface hydrolysis of poly(p-phenylene terephthalamide) fibres requires the presence of strong alkali in a non-solvent for the fibres. Thus the use of other alkali metal hydroxides, alkaline earth hydroxides or metal alkoxides in solvents such as alcohols can be inferred from this work by those skilled in the art.

The nature of the surface modification procedure is such that it could be applied to other aromatic polyamide fibres. Thus Kevlar 49 (Trade-mark), another DuPont fibre of similar composition, could be treated similarly. While these are the only aromatic polyamide fibres presently available commercially in North America, other aromatic polyamide fibres which are presently available only as laboratory materials could also be modified similarly.

The cementitious composite described in the following list of examples is a representative autoclaved cement. It is readily apparent that the use of other mineral fillers, besides wollastonite and clay, such as fly ash or other particulate materials, would result in cementitious composites whose properties would similarly be enhanced by the use of surface modified aromatic polyamide fibres. This is because the primary source of the reinforcing action of such fibres is believed to be via ionic interactions between the sodium carboxylate groups on the fibre surface and the calcium aluminosilicate matrix of the cement composite. Thus other cement composites having a calcium aluminosilicate matrix containing different compositions of mineral phases would be expected to behave in a similar manner.

The cement composites reinforced with surface-modified aromatic polyamide fibres have applications as compression-molded parts for electrical applications where thermally stable, non-conducting materials with good resistance to arc formation are required. Because these materials do not contain fibrous silicate minerals such as fiberglass or asbestos, they do not present the same health hazards as asbestos or glass-reinforced materials. A potential range of applications involves their substitution for asbestos-containing materials in schools and other public buildings.

The examples which follow will more clearly illustrate the invention.

EXAMPLE 1

5.0 g of poly(p-phenylene terephthalamide) fibres (DuPont Kevlar 29, 0.5 inch staple, 10 um diameter) were fluffed in a mechanical mixer for 5 minutes. They were then treated with 30 ml of a 10 weight % solution of sodium hydroxide for 20 minutes at 90°–95° C. with stirring. The fibres were filtered off, washed neutral with distilled water and dried in an oven at 100° C. for 1 hour. 5 g of surface-modified fibres were blended with a cementitious inorganix matrix in a mechanical mixer for 3 minutes. The 400 ml water, 9 ml Crest (Trade-mark) an industrial detergent which functions as a release agent, and 64 ml Texcrete (Trade-mark), an internal release agent, were added slowly and mixed for 3 minutes. Test parts were compression molded at 7600 psi and dried at room temperature for 24 hours. The molded parts were autoclaved at 100 psi steam pressure (ca. 160° C.) for 4 hours and were dried in an oven at 200° C. for 24 hours. The cured test parts showed an ultimate flexural strength of 3500 psi (average of 15 samples, +/−430 psi standard deviation) and a tangent modulus of $2.1 \times 10^6$ psi.

For comparison, the same test bars reinforced with Kevlar 29 (Trade-mark) fibres which had not been surface treated had an ultimate flexural strength of 2500+/−430 psi and a tangent modulus of $1.7 \times 10^6$ psi.

EXAMPLE 2

Example 1 was repeated except that the etching of the surface of the aromatic polyamide fibres was carried out using 10 weight % aqueous sodium hydroxide solution at 45° C. for 20 minutes. Cured test parts molded from the same cement composite incorporating 0.21 weight % of the surface-modified fibres had ultimate flexural strength of 3100+/−370 psi (average of 15 samples) and tangent modulus of $1.9 \times 10^6$ psi.

EXAMPLE 3

Example 1 was repeated except that the fibres were etched with 20 weight % aqueous sodium hydroxide at 20°–25° C. for 20 minutes. Cured test parts molded from material having the same composition as described in example 1 had ultimate flexural strength of 2800+/−400 psi and tangent modulus of $1.8 \times 10^6$ psi.

For comparison, the same cured test bars reinforced with 0.2 weight % Kevlar 29 (Trade-mark) which had not been surface modified showed ultimate flexural strength of 1900+/−690 psi and tangent modulus of $1.6 \times 10^6$ psi.

EXAMPLE 4

Example 1 was repeated, except that the cement matrix was modified to contain 0.2 weight % poly(acrylic acid), mixed as a dry powder with the dry inorganic ingredients. Cured test bars prepared from this material had ultimate flexural strength of 3700+/−630 psi (average of 15 samples) and tangent modulus of $2.4 \times 10^6$ psi.

For comparisons, the use of untreated Kevlar (Trade-mark) fibres without poly(acrylic acid) gave a material having an ultimate flexural strength of 1900 psi and tangent modulus of $1.6 \times 10^6$ psi.

EXAMPLE 5

The following example illustrates the adverse effects of an excessively long reaction time between the aromatic polyamide fibres and aqueous alkali.

5.0 g of poly(p-phenylene terephthalamide), fluffed mechanically as in example 1 were treated with 30 ml of a 30 weight % solution of sodium hydroxide at 90°–95° C. for 7.2 hours. The fibres turned from clear yellow to dull brown and were easily broken apart by hand. The fibres were filtered off, washed neutral with water, and dried at 100° C. for one hour. The treated fibres were incorporated at 0.2 weight % into the cementitious composite matrix described in example 1, and pressed and cured in the same manner as in example 1. The cured test parts had an ultimate flexural strength of 2920+/−710 psi and a tangent (bending) modulus of $1.8 \times 10^6$ psi (average of 10 samples).

For comparison, the same cured test bars prepared without the addition of surface modified Kevlar 29 (Trade-mark) fibre had an ultimate flexural strength of 3500+/−370 psi and a tangent modulus of $1.9 \times 10^6$ psi (average of 10 samples).

EXAMPLE 6

The following example illustrates the effects of reaction conditions which were too mild to cause sufficient modification of the surface of the aromatic polyamide fibre by aqueous alkali.

5.0 g of poly(p-phenylene terephthalamide) fibres, fluffed mechanically as in example 1, were treated with 30 ml of 10 weight % aqueous NaOH at 20° C. for 20 minutes. The fibres were then filtered, washed neutral with water and dried at 100° C. for one hour. The treated fibres were incorporated at 0.2% by weight into the cement composite matrix described in example 1, and pressed and cured as in example 1. Cured test bars had ultimate flexural strength of 1980+/−560 psi and tangent modulus of $1.8 \times 10^6$ psi (average of 10 samples). For comparison the same cured test bars prepared with the incorporation of 0.2 weight % untreated Kevlar 29 (Trade-mark) fibres had ultimate flexural strength of 2120+/−410 psi and tangent modulus of $1.7 \times 10^6$ psi (average of 10 samples).

EXAMPLE 7

Example 1 was repeated except that the Kevlar 29 (Trade-mark) fibres were treated with 30 ml of 30 weight % of aqueous NaOH at 40°–45° C. for 20 minutes. Cured test parts molded from a cement composite having the same composition as that of example 1 had ultimate flexural stength of 2300 psi (average of 8 samples) v. 1800 psi for identical samples incorporating untreated Kevlar (Trade-mark) fibres.

EXAMPLE 8

Example 1 was repeated except that the Kevlar 29 (Trade-mark) fibres were treated with 30 ml of 40 weight % aqueous NaOH at 40°–45° C. for 20 minutes. Cured test parts molded from a cement composite having the same composition as that of example 1 had ultimate flexural strength of 2000+/−210 psi (average of 10 samples) and tangent modulus of $1.7 \times 10^6$ psi, compared with 1800 psi and $1.5 \times 10^6$ psi respectively, obtained for identical samples incorporating untreated Kevlar (Trade-mark) fibres.

The embodiments of the invention in which an exclusive property or privilege is claimed are defined as follows:

1. In a method of preparing a moldable composition containing modified polyamide fibres suitable for incorporation into a cementitious inorganic matrix in which the matrix is adapted to be reinforced with said polyamide fibres, the improvement consisting of surface treating said polyamide fibres with an alkaline hydroxide or alkoxide solution to improve bonding between said matrix and said fibres, prior to incorporating said fibres into said matrix.

2. A method as defined in claim 1, wherein said surface treating of said fibres is carried out under temperature conditions of between about 20° C. and about 95° C.

3. A method as defined in claim 2, wherein said surface treating of said fibres is carried out for between 20 minutes and about 7 hours.

4. A method as defined in claim 1, wherein said surface treating of said fibres is carried out with a solution containing 10% to 40% by weight of alkali metal hydroxide.

5. A method as defined in claim 4, wherein said solution contains from about 10 to about 40% by weight of sodium hydroxide.

6. A method as defined in claim 5, wherein said solution contains from about 10 to about 20% by weight of sodium hydroxide.

7. A method as defined in claim 6, wherein said treating of said fibres is carried out for a period of about 20 minutes and at a temperature between about 40° C. and about 95° C.

8. A method as defined in claim 1, 2 or 3, wherein said polyamide is poly(p-phenylene-terephthalamide).

9. A method as defined in claim 4, 5 or 6 wherein said polyamide is poly(p-phenylene-terephthalamide).

10. A method as defined in claim 1, 2 or 3, wherein said hydroxide is a member selected from the group consisting of alkaline earth hydroxides, ammonium hydroxides, or mixtures thereof.

11. A method as defined in claim 1, 2 or 3, wherein said alkoxide is a metal alkoxide.

12. A method as defined in claim 1, 2 or 3, wherein said cementitious inorganic matrix includes a mineral filler.

13. A method as defined in claim 1, 2 or 3, wherein said cementitious inorganic matrix includes a member selected from the group consisting of clay and wollastonite.

14. A moldable composition having a cementitious inorganic matrix reinforced with surface modified polyamide fibres, said fibres having a modified surface of free ionic carboxylate salt groups.

15. A moldable composition as defined in claim 14, wherein said cementitious inorganic matrix comprises a calcium aluminosilicate cement matrix.

16. A moldable composition as defined in claim 14, wherein said polyamide fibres are poly(p-phenyleneterephthalamide) fibres.

17. A moldable composition as defined in claim 15, wherein said cementitious inorganic matrix includes a mineral filler.

18. A moldable composition as defined in claims 15 or 17, wherein said cementitious inorganic matrix includes a member selected from the group consisting of clay, and wollastonite.

19. A molded product prepared from the moldable composition of claim 14, 15 or 16.

20. A method of preparing an improved inorganic matrix composition suitable for molding comprising incorporating into said inorganic matrix surface modified polyamide fibres, said fibres having a modified surface containing free ionic carboxylate salt groups.

21. A method as defined in claim 20, wherein said inorganic matrix comprises a calcium aluminosilicate cement matrix.

22. A method as defined in claim 20 or 21, wherein said polyamide fibres are poly(p-phenylene-terephthalamide) fibres.

23. A method as defined in claim 1, wherein said matrix includes fly ash.

24. A moldable composition as defined in claim 15, wherein said matrix includes fly ash.

25. A method as defined in claim 1 wherein said matrix comprises a calcium aluminosilicate cement matrix.

* * * * *